United States Patent
Rousseau et al.

(10) Patent No.: US 12,321,042 B2
(45) Date of Patent: Jun. 3, 2025

(54) METHOD AND DEVICE FOR DETERMINING AT LEAST AN OPTICAL FEATURE OF A PROGRESSIVE LENS TO BE PLACED IN A FRAME FOR VISION CORRECTION OF A SUBJECT

(71) Applicant: Essilor International, Charenton-le-pont (FR)

(72) Inventors: Benjamin Rousseau, Charenton-le-pont (FR); Cyril Guilloux, Charenton-le-pont (FR); Melanie Heslouis, Charenton-le-pont (FR); Sebastien Fricker, Charenton-le-pont (FR)

(73) Assignee: Essilor International, Charenton-le-pont (FR)

( * ) Notice: Subject to any disclaimer, the term of this patent is extended or adjusted under 35 U.S.C. 154(b) by 604 days.

(21) Appl. No.: 17/614,715

(22) PCT Filed: May 27, 2020

(86) PCT No.: PCT/EP2020/064744
§ 371 (c)(1),
(2) Date: Nov. 29, 2021

(87) PCT Pub. No.: WO2020/239860
PCT Pub. Date: Dec. 3, 2020

(65) Prior Publication Data
US 2022/0221740 A1    Jul. 14, 2022

(30) Foreign Application Priority Data
May 31, 2019    (EP) ..................................... 19305699

(51) Int. Cl.
G02C 13/00    (2006.01)

(52) U.S. Cl.
CPC ....... *G02C 13/005* (2013.01); *G02C 2202/02* (2013.01)

(58) Field of Classification Search
CPC ........................... G02C 13/005; G02C 2202/02
(Continued)

(56) References Cited

U.S. PATENT DOCUMENTS 6,382,789 B1    5/2002    Baudart et al.
6,607,271 B2    8/2003    Bar et al.
(Continued)

FOREIGN PATENT DOCUMENTS

EP    2877893 B1    9/2016
EP    3 264 165 A1    1/2018
(Continued)

OTHER PUBLICATIONS

European Office Action issued Jan. 23, 2024 in European Application No. 20 733 343.6, 8 pages.
(Continued)

*Primary Examiner* — Tuyen Tra
*Assistant Examiner* — Rahman Abdur
(74) *Attorney, Agent, or Firm* — Oblon, McClelland, Maier & Neustadt, L.L.P.

(57) ABSTRACT

The invention relates to a method for determining at least an optical feature of an ophthalmic lens to be placed in a frame for vision correction of a subject, comprising: a) measuring (100) a value of a fitting parameter linked to the subject and/or the frame or a value of a dioptric parameter of the subject, thanks to a measurement process, b) providing (200) a level of uncertainty of said value measured in step a) depending on said measurement process, c) determining (400; 510; 620; 640) said optical feature of said ophthalmic lens by taking into account said value measured in step a) and said level of uncertainty provided in step b).

14 Claims, 5 Drawing Sheets

Figure 1:
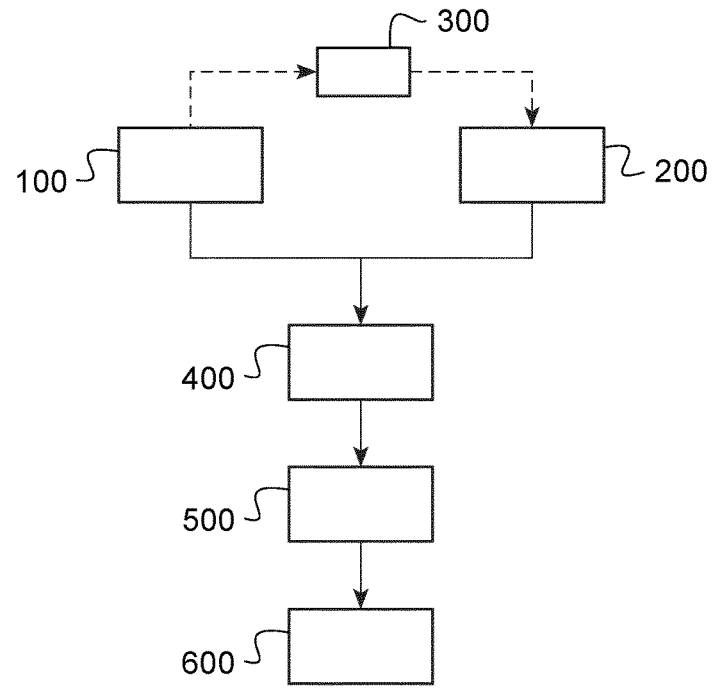

(58) Field of Classification Search
USPC .......................................................... 351/205
See application file for complete search history.

(56) References Cited

U.S. PATENT DOCUMENTS

| | | | |
|---|---|---|---|
| 7,950,800 | B2 | 5/2011 | Nauche et al. |
| 9,535,270 | B2 | 1/2017 | Divo et al. |
| 2009/0103046 | A1 | 4/2009 | Welk et al. |
| 2016/0274383 | A1 | 9/2016 | Petignaud et al. |
| 2016/0353985 | A1 | 12/2016 | Haddadi et al. |
| 2017/0001095 | A1 | 1/2017 | Lovat |
| 2017/0038608 | A1 | 2/2017 | Cabeza-Guillen et al. |

FOREIGN PATENT DOCUMENTS

| | | |
|---|---|---|
| FR | 2 915 290 B1 | 10/2008 |
| WO | WO 2020/064747 A1 | 4/2020 |

OTHER PUBLICATIONS

International Search Report and Written Opinion issued on Sep. 1, 2020 in PCT/EP2020/064744 filed May 27, 2020, 10 pages.

Gordon, C., et al., "1988 Anthropometric Survey of U.S. Army Personnel: Methods and Summary Statistics", United States Army Natick Research, Development and Engineering Center, 1989, 649 total pages.

Ofice Action dated Oct. 24, 2024, issued in counterpart CN Application No. 202080033240.5, with English Translation, (17 pages).

College Physics Experiment vol. 1, Liu Libao, Heihang University Press (Dec. 31, 2010), pp. 3-5, relevant English Translation is in Chinese Office Action dated Oct. 24, 2024. (18 pages).

Performance Testing Manual for Polymer Materials, Chen Zhimin, Machinery Industry Press (Dec. 31, 2015), pp. 21-23, relevant English Translation is in Chinese Office Action dated Oct. 24, 2024. (5 pages).

Tolerance fit and technical measurement, Zhao Yantie and Wang Libo, Beihang University press (Dec. 31, 2015), pp. 53-54, relevant English Translation is in Chinese Office Action dated Oct. 24, 2024. (4 pages).

METHOD AND DEVICE FOR DETERMINING AT LEAST AN OPTICAL FEATURE OF A PROGRESSIVE LENS TO BE PLACED IN A FRAME FOR VISION CORRECTION OF A SUBJECT

TECHNICAL FIELD OF THE INVENTION

The invention relates to a method and device for determining at least an optical feature of an ophthalmic lens to be placed in a frame for vision correction of a subject.

BACKGROUND INFORMATION AND PRIOR ART

Known methods and devices for determining an ophthalmic lens for a subject comprises a measurement of fitting and/or dioptric parameters of the subject.

The usual measurement process is a manual process achieved by the eye care professional, for example an optometrist or an ophthalmologist, or an automatic measure performed by an electronic device.

These known methods provide measured values with different levels of accuracy, as they at least partly rely on the operation by the eye care professional, in particular for alignment and/or adjustment of the relative positions between subject, instrument used for measure, and, eventually, the eye care professional himself.

As a consequence, the measured values of the fitting and/or dioptric parameters on which the determination of the ophthalmic lens is based risk to be inaccurate. The ophthalmic lens designed for the subject may therefore be poorly adapted or positioned in front of the eye, with a risk of difficult acceptance by the subject.

SUMMARY OF THE INVENTION

Therefore one object of the invention is to limit the risk of bad acceptance due to uncertainties on the measured value of the fitting and/or dioptric parameter.

The above objects are achieved according to the invention by providing a method for determining at least an optical feature of an ophthalmic lens to be placed in a frame for vision correction of a subject, comprising:
a) measuring a value of a fitting parameter linked to the subject and/or the frame or a value of a dioptric parameter of the subject, thanks to a measurement process,
b) providing a level of uncertainty of said value measured in step a) depending on said measurement process,
c) determining said optical feature of said ophthalmic lens by taking into account said value measured in step a) and said level of uncertainty provided in step b).

By "taking into account", it is meant here and in the following "depending on". In practice, the values or parameters are "taken into account" in a magnitude when this magnitude depends on these values or parameters.

Thanks to the invention, it is possible to reach a compromise between maintaining the optical correction delivered to the subject and risk of bad adaptation.

In practice, thanks to the invention, the lens design is adapted to limit the risk of fitting errors and compensate for refraction inaccuracy for fewer returns.

Progressive as well as single vision lenses that gives good visual performance to the wearer even if the lens is not accurately fitted or even if the refraction provided is not accurate are provided thanks to the invention.

Moreover, existing lens designs may be modified to become more robust to variation of the different fitting and/or dioptric parameters.

Other advantageous and non-limiting features of the invention are as follows:
said optical feature determined in step c) comprises at least one of the following:
a value of a dioptric feature of the lens,
a position of a remarkable point on the lens,
a position and/or extent and/or shape of a remarkable zone of the lens;
said dioptric feature of the lens comprises least one of the following features: mean spherical power, mean cylinder power or axis on a reference zone, spherical power, cylinder power or axis at a reference point, power progression length, power variation value, addition, profile of the power progression between two reference points of the lens, binocular average value between right and left eye for any of the preceding dioptric features, and said position of a remarkable point on the lens comprises at least one of the following features: position of far vision point, position of an intermediate vision point, position of near vision point, and position of fitting cross of the lens, said position and/or extent and/or shape of a remarkable zone of the lens comprises at least one of the following features: position and/or extent and/or shape of a near vision, intermediate vision or far vision zone;
said fitting parameter comprises at least one of the following:
a geometrical parameter of the frame,
a morphological parameter of the subject,
a geometric-morphological parameter relative to the position and/or orientation of the frame relative to the head of the subject,
a behavioral parameter of the subject;
said geometrical parameter of the frame comprises at least one of the following quantities: wrap angle of the frame and/or lens in the frame, inclination of the front portion of the frame relative to the temples or pantoscopic angle of the frame, horizontal and/or vertical size of the front part of the frame; said morphological parameter of the subject comprises at least one of the following quantities: pupillary distance, head width, rhinometer parameters; said geometric-morphological parameter relative to the position and/or orientation of the frame relative to the head of the subject comprises at least one of the following quantities: fitting height, position of the reference point for near vision relative to the subject, position of the fitting cross relative to the subject, pantoscopic tilt or relative wrap angle of the frame and/or lenses placed on the head of the subject, position of the lens in the frame relative to the eye when the frame is placed on the head of the subject: distance between the center of rotation of the eye and the lens fitted in the frame, distance between the apex of the cornea and the lens fitted in the frame; said behavioral parameter of the subject comprises at least one of the following quantities: head posture data, reading distance, horizontal and/or vertical eye/head movement ratio in far vision or near vision;
said dioptric parameter comprises at least one of the following quantities: refraction value such as spherical refraction value, also called sphere value, and/or astigmatism value, comprising for example cylinder power value and/or axis for far and/or intermediate vision and/or near vision for each eye of the subject or an average value of the previously cited quantities for both eyes, addition;

in step b), the level of uncertainty of the value measured in step a) is estimated taking into account at least one process parameter, comprising at least one of the following:
type of measurement process,
accuracy of the instrument used to carry out a measurement, if any,
accuracy of the model used, if any
role of the operator,
sensitivity of the measurement process to variations linked to the operator, and/or the subject and/or the relative position of the frame and head of the subject;

in step b), the level of uncertainty of said value is estimated through a statistical method;

in step b), the level of uncertainty of said measurement process is estimated taking into account an uncertainty linked to at least one implementation circumstance of said measurement process, wherein said implementation circumstance comprises at least one of the following implementation circumstances:
identity of the operator of the measurement process,
type of device used for carrying out the measurement process,
operating protocol used for carrying out the measurement process,
identity of the subject submitted to the measurement process,
variability of the relative position of the frame and head of the subject during the measurement process;

in step b), the level of uncertainty of said measurement process is estimated taking into account an accuracy and/or a reproducibility of the value measured in step a);

in step b), an uncertainty linked to an implementation circumstance is determined by a statistical method comprising the following steps:
measuring values of said fitting or dioptric parameter using said measurement process for a large number of occurrences of the measurement process, while varying said implementation circumstance among predefined practical possible circumstances,
determining a reference mean of the values of said fitting or dioptric parameter determined while varying said implementation circumstance among said predefined practical possible circumstances,
determining said uncertainty linked to each predefined practical possible implementation circumstance by comparing a value of the fitting or dioptric parameter measured in the specific implementation circumstance with said reference mean.

in step b), an uncertainty linked to an implementation circumstance is determined by a statistical method comprising the following steps:
measuring values of said fitting or dioptric parameter using said measurement process for a large number of occurrences of said measurement process, while varying said implementation circumstance among predefined practical possible circumstances,
determining a reference standard deviation of the values of said fitting or dioptric parameter determined while varying said specific implementation circumstance among said predefined practical possible circumstances,
determining said uncertainty linked to each predefined practical possible implementation circumstance by comparing a standard deviation of values of the fitting or dioptric parameter measured with this predefined practical possible circumstance with said reference standard deviation;

in step c),
determining a corrected value of said fitting or dioptric parameter based on said value measured in step a) and on the level of uncertainty estimated in step b),
determining said optical feature of the lens based on this corrected value;

in step c),
determining a preliminary optical feature of the lens based on the value measured in step a) without taking into account said level of uncertainty estimated in step b), and
correcting said preliminary optical feature based on said level of uncertainty estimated in step b) to obtain said optical feature;

a further step d) of determining an optical design of a lens by calculations based on said optical feature determined in step c);

in step c), determining said optical feature by choosing an optical design from a predetermined set of optical designs;

in step c),
determining a reference optical design by calculation based on the value of the fitting or dioptric parameter measured in step a) and a theoretical low level of uncertainty and
modifying this reference optical design based on said level of uncertainty estimated in step b);

said reference optical design is modified by moving the fitting cross upwards by a distance determined based on said level of uncertainty and decreasing the progression length by the same distance or a different distance determined based on said level of uncertainty;

said distance is equal to a fraction of the uncertainty, for example in millimeters, this fraction being comprised between a quarter of the uncertainty and the full uncertainty;

said measurement process comprises at least one of the following:
manual measurement of said value of the fitting parameter,
automatic measurement of said value of the fitting parameter using an image capture device and a treatment module programmed to determine the fitting parameter on the basis of an image captured,
automatic measurement of said value of the fitting parameter using a dedicated device,
subjective measurement of said value of the dioptric parameter using high precision device with steps equal to 0.01 diopter, or inferior or equal to 0.12 diopter or standard precision device having steps of 0.25 diopter,
objective measurement of said value of the dioptric parameter using photorefraction, and/or sciascopy and/or autorefractometry;

The invention also relates to a device for determining at least an optical feature of an ophthalmic lens to be placed in a frame for vision correction of a subject, comprising:
a measuring unit for measuring a value of a fitting parameter linked to the subject and/or the frame or a value of a dioptric parameter of the subject, according to a measurement process, a computer unit for providing a level of uncertainty of said value measured by the measuring unit depending on said measurement process, and determining said optical feature of said ophthalmic lens by taking into account said value measured by the measuring unit and said level of uncertainty provided.

DETAILED DESCRIPTION OF EXAMPLE(S)

The following description with reference to the accompanying drawings will make it clear what the invention consists of and how it can be achieved. The invention is not limited to the embodiment/s illustrated in the drawings. Accordingly, it should be understood that where features mentioned in the claims are followed by reference signs, such signs are included solely for the purpose of enhancing the intelligibility of the claims and are in no way limiting on the scope of the claims.

Figure 5:
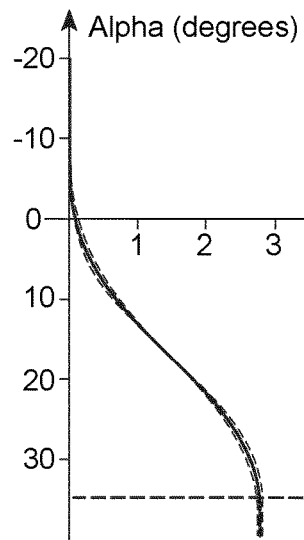
Figure 8:
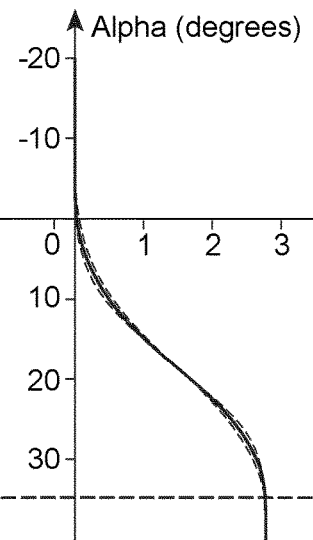
Figure 11:
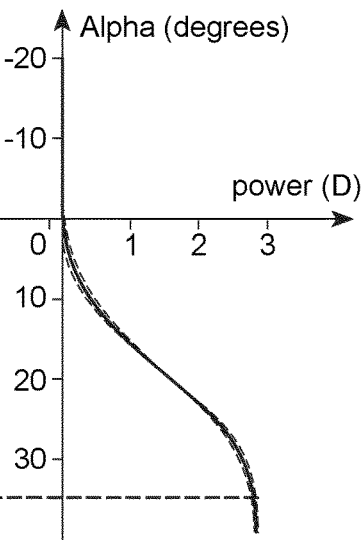
Figure 6:
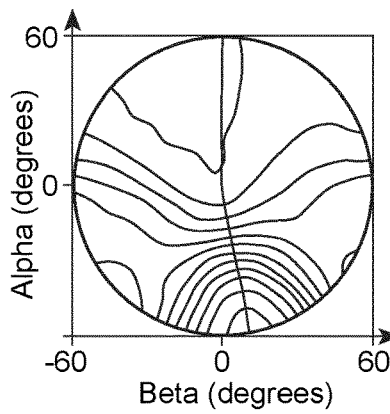
Figure 9:
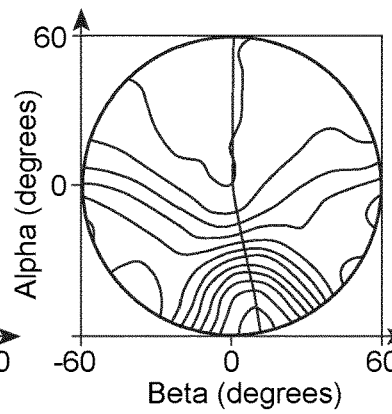
Figure 12:
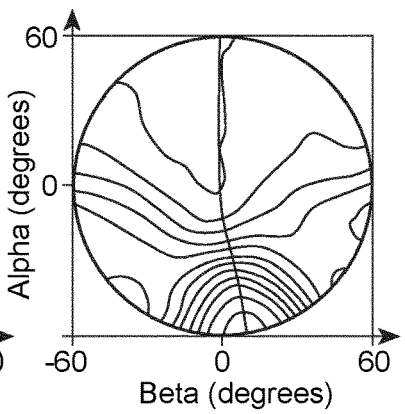
Figure 7:
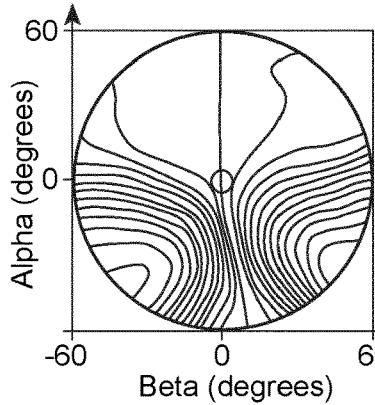
Figure 10:
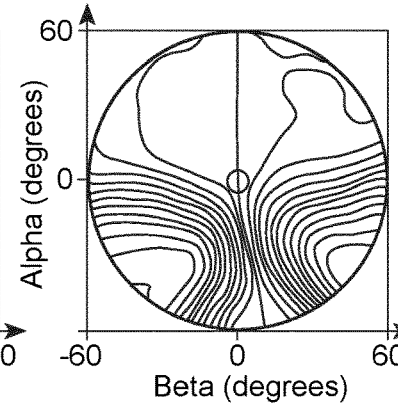
Figure 13:
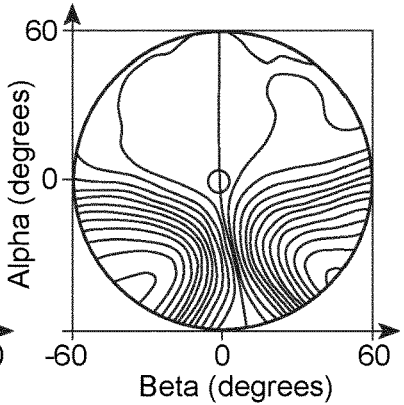
Figure 14:
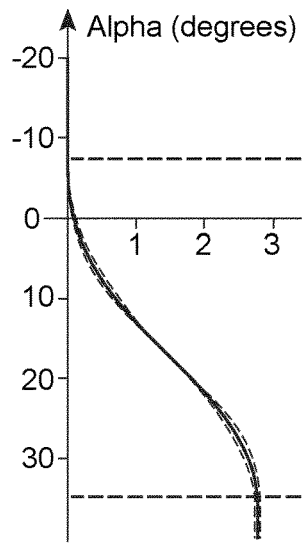
Figure 20:
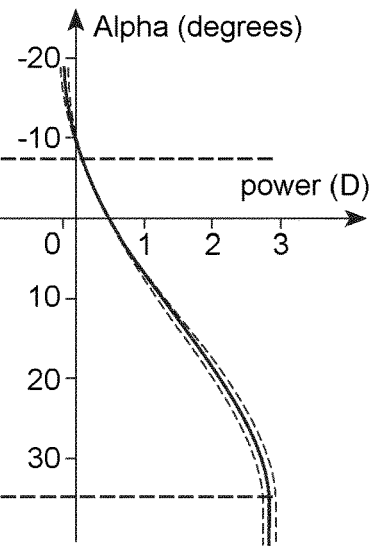
Figure 15:
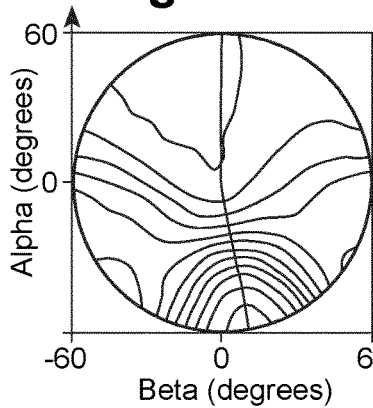
Figure 21:
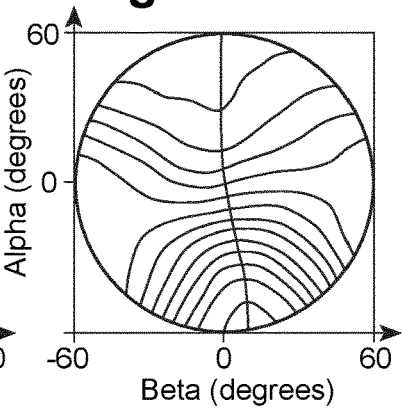
Figure 16:
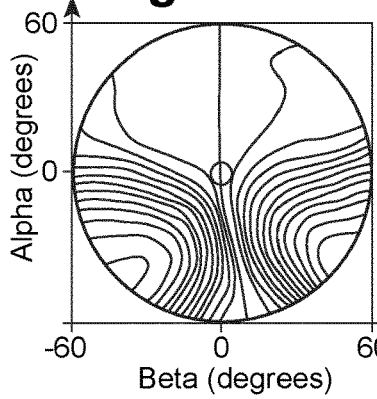
Figure 22:
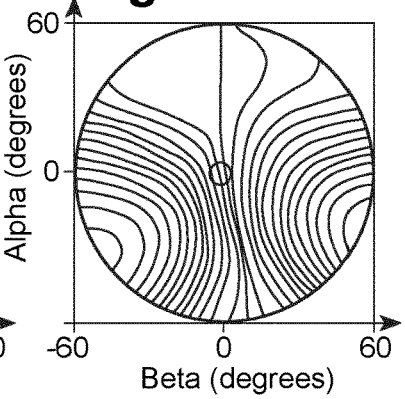
Figure 23:
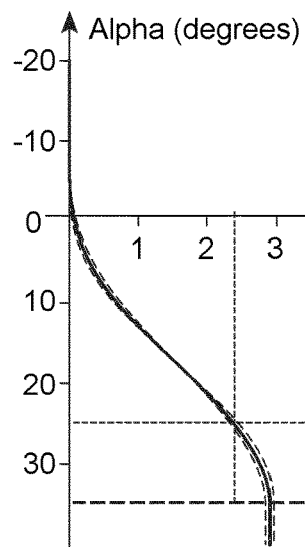
Figure 29:
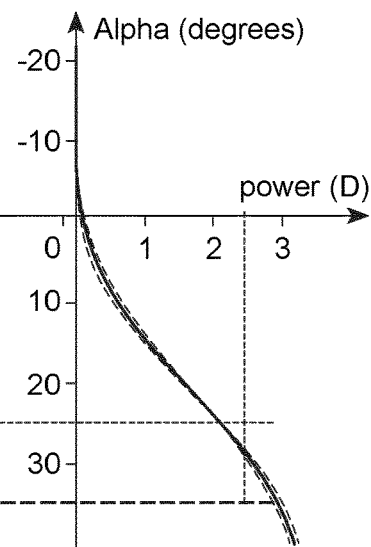
Figure 24:
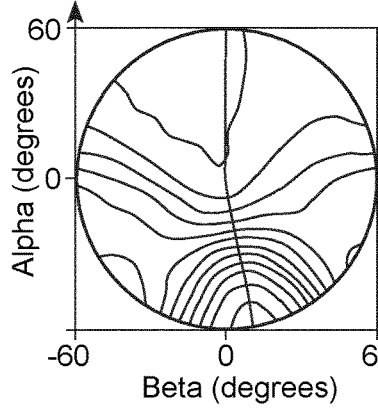
Figure 30:
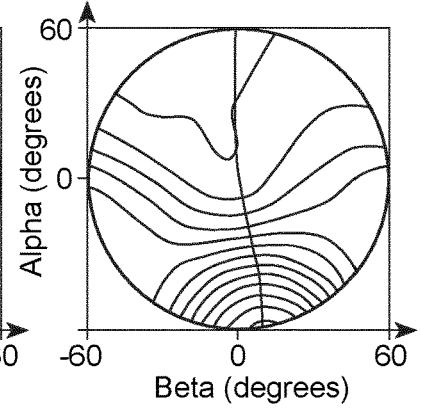
Figure 25:
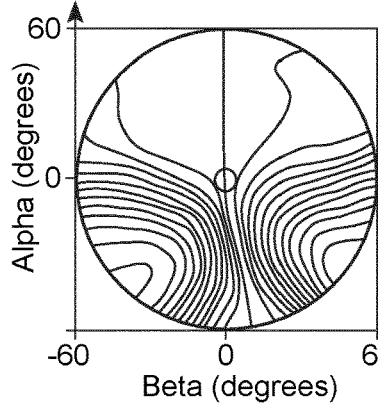
Figure 31:
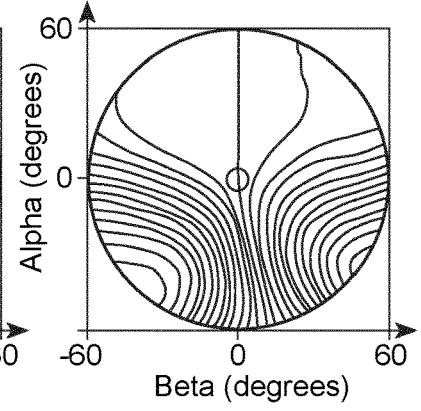

In the accompanying drawings:

FIGS. 1 to 4 are schematics of the steps performed during four possible embodiments of the method according to the invention;

FIGS. 5 to 7 give an example of a conventional progressive lens design for a plano lens with addition of 2.5 diopters, FIGS. 8 to 10 give an example of progressive lens design determined according to the invention for a plano lens with addition of 2.5 diopters, taking into account an uncertainty of 1 millimeter on the fitting height measured for the subject, FIGS. 11 to 13 give an example of progressive lens design determined according to the invention for a plano lens with addition of 2.5 diopters, taking into account an uncertainty of 2 millimeters on the fitting height measured for the subject, FIGS. 14 to 16 are identical to FIGS. 5 to 7, FIGS. 17 to 19 give a first example of progressive lens design determined according to the invention for a plano lens with addition of 2.5 diopters, taking into account an uncertainty on the far vision spherical refraction value prescribed, FIGS. 20 to 22 give a second example of progressive lens design determined according to the invention for a plano lens with addition of 2.5 diopters, taking into account an uncertainty on the far vision spherical refraction value prescribed, FIGS. 23 to 25 are identical to FIGS. 5 to 7, FIGS. 26 to 28 give a first example of progressive lens design determined according to the invention for a plano lens with addition of 2.5 diopters, taking into account an uncertainty on the near vision spherical refraction value prescribed, FIGS. 29 to 31 give a second example of progressive lens design determined according to the invention for a plano lens with addition of 2.5 diopters, taking into account an uncertainty on the near vision spherical refraction value prescribed.

FIGS. 5, 8, 11, 14, 17, 20, 23, 26, 29 are graphs showing the mean power (full line) and sagittal and tangential powers (dotted lines) in diopters of the lens with the corresponding optical design as a function of the vertical angle of vision ALPHA, also called vertical declination gaze angle. The origin (point of value equal to 0) of the horizontal axis corresponds to the mean prescribed power (mean sphere) of the lens. The origin of the vertical axis corresponds to the gaze passing through the fitting cross, so that the corresponding gaze direction corresponds to the primary gaze direction.

FIGS. 6, 7, 9, 10, 12, 13, 15, 16, 18, 19, 21, 22, 24, 25, 27, 28, 30, 31 are graphs showing the lines with same mean power, hereafter line iso power, of the lenses having the corresponding optical designs as a function of the vertical angle of vision ALPHA and the horizontal angle of vision BETA. On FIGS. 5, 8, 11, 14, 17, 20, 23, 26, 29, the dashed lines indicate the gaze declination for far vision control point and near vision control point. The dash-dotted lines on FIG. 23 indicate eye declination when the power reaches 0.85% of the 2.75 (=addition+0.25 D). It is copied onto FIGS. 26 and 29 to show how the power changed at that gaze direction.

In order to manufacture eyeglasses for vision correction of a subject, numerous parameters are taken into account.

In order to customize an ophthalmic lens for a specific subject, many geometrical and/or physiological and/or postural and/or behavioral parameters of the subject are determined. Some features of the frame and/or some parameters relative to the placement of the frame on the head of the subject may as well be taken into account.

Eyeglasses typically comprise a frame and two ophthalmic lenses. The frame is typically chosen by the subject. The lenses are thus determined based on different parameters, including parameters relative to the chosen frame, parameters relative to the subject and parameters linked to the relative position of the frame on the face of the subject.

In this context, the invention proposes a method for determining at least an optical feature of an ophthalmic lens to be placed in a frame for vision correction of a subject, comprising:

a) measuring 100 a value of a fitting parameter linked to the subject and/or the frame or a value of a dioptric parameter of the subject, thanks to a measurement process, b) providing 200 a level of uncertainty of said value measured in step a) depending on said measurement process, c) determining 500; 510; 520; 620; 640 said optical feature of said ophthalmic lens by taking into account said value measured in step a) and said level of uncertainty provided in step b).

The invention also related to a device for determining at least an optical feature of an ophthalmic lens to be placed in a frame for vision correction of a subject, comprising:

a measuring unit for measuring a value of a fitting parameter linked to the subject and/or the frame or a value of a dioptric parameter of the subject, according to a measurement process, a computer unit for providing a level of uncertainty of said value measured by the measuring unit depending on said measurement process, and determining said optical feature of said ophthalmic lens by taking into account said value measured by the measuring unit and said level of uncertainty provided.

Thanks to the invention, the lens design may take into account the measurement process of the fitting and dioptric parameters.

More particularly, the lens design may be made to be more or less tolerant to measurements errors depending on the measurement process used to determine of the value of the parameters on which the lens optical design is based.

Consequently, a lens design may be generated or obtained by transforming a reference design according to the accuracy or repeatability of the measurement process.

The ophthalmic lens may be a progressive lens or a single vision lens.

The progressive lens is a multifocal lens. It usually has at least two zones dedicated to a different vision distance among three possible vision distances: near, intermediate, far vision distances. For example, the progressive lens may have a zone for far vision and a zone for near vision. It may also have a zone for intermediate vision and a zone for near vision.

A distance of far vision is typically comprised between infinity and 105 centimeters. A distance of intermediate vision is typically comprised between 105 and 50 centimeters. A distance of near vision is typically comprised between 50 and 30 centimeters.

Each zone is defined by a position and at least an optical feature at a reference point, thereafter called far vision point, intermediate vision point and near vision point and its extent along horizontal and vertical directions in conditions of use.

The extent of each zone is defined as the distance or angular range in which the difference between the mean spherical power generated by the lens and the prescribed spherical power and/or the resulting astigmatism of the progressive lens are within a predetermined range about the values prescribed to the subject.

The resulting astigmatism is defined in document U.S. Pat. No. 6,382,789 as the difference between the prescribed astigmatism power and the astigmatism power actually generated by the lens. The predetermined range may be between 0.5 and 1 diopter.

Between the two zones, the optical features of the progressive lens change continuously. The region of the lens between two zones as described here is often called progression corridor.

The single vision lens is a monofocal lens with only one zone adapted to the subject for near vision, intermediate vision or far vision. This zone is defined by a position and at least an optical feature at a reference point, thereafter called far vision point, intermediate vision point and near vision point and its extent along horizontal and vertical directions in conditions of use.

According to the invention, said optical feature determined in step c) comprises at least one of the following:
  a value of a dioptric feature of the lens,
  a position of a remarkable point on the lens,
  a position and/or extent and/or shape of a remarkable zone of the lens.

More precisely, said dioptric feature of the lens comprises at least a mean spherical power or a mean cylinder power or axis on a reference zone.

For example the dioptric feature of the lens may be a mean spherical power, mean cylinder power, mean axis or mean resulting astigmatism determined as an average of the spherical power, cylinder power, axis or resulting astigmatism of the lens at points of the lens belonging to the near vision, intermediate vision or far vision zone.

Said dioptric feature of the lens may also comprise at least a spherical power, cylinder power or axis or mean resulting astigmatism at a reference point.

This reference point is for example the far vision, intermediate vision or near vision point for progressive lenses. It may also be a fitting cross of the lens for progressive or single vision lenses. The fitting cross is a marking of the lens that may correspond to the optical center of the lens or to the primary gaze direction of the subject.

Primary gaze direction is here defined as the gaze direction of the subject when looking at an object in distance while standing in natural and relax posture of head and body. It therefore corresponds to the gaze direction of the subject in the natural posture defined hereafter.

Said dioptric feature may also comprise a power progression length, power variation value, addition, profile of the power progression between two reference points of the lens for progressive lenses.

The power progression length corresponds to the length of the progression corridor. It is the distance, along a vertical distance in conditions of use, between the two vision zones of the lens. In practice, it is determined for example as the distance between the reference points of these two zones, for example between the far vision point and near vision point or between the intermediate vision point and near vision point.

Said dioptric feature of the lens may also comprise a binocular average value between right and left eye for any of the preceding dioptric features.

Said position of a remarkable point on the lens comprises at least one of the following features: position of far vision point, position of an intermediate vision point, position of near vision point, and position of fitting cross of the lens. Any other point of the lens may also be taken into account.

Said position and/or extent and/or shape of a remarkable zone of the lens comprises at least one of the following features: position and/or extent and/or shape of a near vision, intermediate vision or far vision zone. The position of the near vision, intermediate vision or far vision zone may correspond to the position of the corresponding reference point. The extent may comprise an extent along a vertical and/or horizontal directions in conditions of use, or along direction parallel to the side of the boxing system of the lens or along any other directions.

Step a)

In step a) a value of a fitting parameter linked to the subject and/or the frame or a value of a dioptric parameter of the subject is measured 100 (FIGS. 1 to 4) thanks to a measurement process. This measurement process uses a measurement device as described below.

Said fitting parameter linked to the subject and/or the frame comprises at least one of the following:
  a geometrical parameter of the frame,
  a morphological parameter of the subject,
  a geometrico-morphological parameter relative to the position and/or orientation of the frame relative to the head of the subject,
  a behavioral parameter of the subject.

Said geometrical parameter of the frame may comprise at least one of the following quantities: wrap angle of the frame and/or lens, inclination of the front part of the frame relative to the temples, horizontal and/or vertical size of the front part of the frame, horizontal and/or vertical size of the circles of the frame.

The wrap angle of the frame is defined as the angle between a facial mean plane of the bridge and a mean plane of the circle of the frame. The facial mean plane of the bridge is a plane globally perpendicular to the plane going through the straight part of the temples. Definitions of the geometrical parameters of the frame given in document US2017001095 may be used. The wrap angle of the lens mounted in the frame placed on the head of the subject is defined as the angle between the facial mean plane of the bridge and a mean plane of a lens mounted on the frame. This wrap angle of the lens may be different from the wrap angle of the frame as the lenses may not follow exactly the circles of the frame. In other words, each lens may be tilted relative to the mean plane of the circle in which it is placed.

The inclination of the front portion of the frame relative to the temples corresponds to the pantoscopic angle of the frame, that is to say the angle between a mean plane of the circles or lenses mounted in the frame and a plane going through the temples. The front part of the frame comprises the circles and bridge of the frame.

The pantoscopic angle may alternatively be defined the vertical inclination of the lens relative to the vertical direction given by a plumb.

The horizontal and/or vertical size of the front part of the frame corresponds to the exterior width and/or height of the front part of the frame, width and height being measured in the mean plane of this front part of the frame.

The horizontal and/or vertical size of the circle of the frame may comprise the interior width and/or height of the circles of the frame.

Said morphological parameter of the subject comprises at least one of the following quantities: pupillary distance, head width, rhinometer parameters.

The pupillary distance is the distance between the center the pupils of the subject.

The head width is the distance, in a facial plane perpendicular to the sagittal plane of the head and parallel to the line joining the center of the eyes of the subject, between the lateral points of the face that are further away from each other. For example, it corresponds to the binocular breadth maximum, as defined in the following document: ANSUR Technical report "1988 *Anthropometric survey of U.S. Army Personnel: Methods and summary Statistics*" by Claire C. Gordon and al., page 479. Rhinometer parameters are the distances and angles measured thanks to a rhinometer as known from the man skilled in the art.

Rhinometer parameters for example comprise the nose geometrical parameters or the distance between the nose and the ear.

Said geometrico-morphological parameter relative to the position and/or orientation of the frame relative to the head of the subject comprises at least one of the following quantities: fitting height, position of the reference point for near vision relative to the subject, position of the fitting cross relative to the subject, pantoscopic tilt or relative wrap angle of the frame and/or lens mounted in the frame placed on the head of the subject, position of the lens in the frame relative to the eye when the frame is placed on the head of the subject: distance between the center of rotation of the eye and the lens fitted in the frame, distance between the apex of the cornea and the lens fitted in the frame.

The fitting height corresponds to the distance between the pupil of the eye of the subject and the bottom edge of the lens placed in front of this eye when the frame is placed on the head of the subject measured in the facial plane. The fitting height may be further defined according to any usual definition used by the man skilled in the art, including a "boxing" or "datum" definition.

The position of the fitting cross of the lens relative to the frame is also an important fitting parameter for equipment with lenses, in particular with progressive lenses. It is necessary to ensure that this fitting cross of the lens, when placed inside the frame, and when the frame is placed on the head of the subject, will be in front of the pupil of the subject when he is in his natural posture.

The natural posture is assumed by the individual when he looks straight ahead to the horizon without any visual or postural constraint. This natural posture is also called orthostatic posture and corresponds to the position in which the individual achieves minimal efforts.

The pantoscopic tilt of the lenses mounted in the frame placed on the head of the subject is the angle between a mean plane of the lenses and the facial plane. It may be the same as the angle of the front part of the frame relative to the facial plane of the subject if the lenses follow exactly the frame. But in some cases where the lenses are not perfectly mounted inside the frame, the pantoscopic tilt of the lenses may be different from that of the front part of the frame.

Definitions of the geometrical parameters, in particular pantoscopic angle and wrap angles of the lenses and/or frame given in document US2017001095 may be used.

The distance between the center of rotation of the eye and the lens fitted in the frame and distance between the apex of the cornea and the lens fitted in the frame are measured between the center of rotation of the eye or the apex of the cornea and the back face of the lens facing the subject.

Said behavioral parameter of the subject comprises at least one of the following quantities: head posture data, reading distance, horizontal and/or vertical eye/head movement ratio in far vision or near vision.

Head posture data comprises at least a value of a parameter representative of the posture of the subject.

The posture of the subject is here the posture of his head. It is for example determined by measuring at least one angle of rotation of the head about an axis of a known referential. Preferably, the angles of rotation of the head of the subject about at least two or three axes of this known referential are determined.

Different methods for determining a parameter representative of the posture of the individual are known from the man skilled in the art. These methods use for example one or several images of the head of the individual captured by an image capture apparatus, and determine at least one angle of rotation of the head about an axis of a referential linked to the image capture apparatus. Preferably, the angle of rotation of the head of the individual is determined about at least two or three axes of the referential linked to the image capture apparatus, for a more complete determination of the posture of the head of the individual.

For example, it is known to determine the parameter representative of the posture of the individual based on an image capture of the head of the individual wearing a posture control clip. Such a posture control clip carries known patterns allowing determining the posture of the head in three dimensions.

Another possibility is to use a posture monitoring device that comprises a sensor with a gyroscope and/or an accelerometer and/or a magnetometer and/or by video with facial landmarks.

The reading distance is measured as the distance from the eye or frame placed on the head of the subject at which the subject naturally places a display for reading a text or identifying signs displayed on the display.

The horizontal and/or vertical eye/head movement ratio in far vision or near vision is the ration between the angular extent of the rotation movement of the eye and the angular extent of the rotation movement of the head while the subject is performing a predetermined visual task such as reading a text of known width at a given distance.

Said dioptric parameter of the subject comprises at least one of the following quantities: spherical refraction and/or astigmatism value and/or axis and/or prism and/or base of the prism for far and/or intermediate vision and/or near vision for each eye of the subject or an average value of the previously cited quantities for both eyes, addition for progressive lenses. The dioptric parameter comprises in a general manner all the parameters prescribed by the eye care practitioner during a eye exam.

Addition of the lens is the dioptric difference between the spherical power of the lens in the far vision zone and the spherical power of the lens in the near vision zone. It corresponds to the spherical power value to be added to the distance vision prescription of the presbyopic patient to correct his vision at near distance. The value of the abovementioned parameter may be determined thanks to different measurement process.

Said measurement process may comprise a process belonging to different categories of processes.

A first category of processes corresponds to a manual measurement of said value of the fitting parameter, for example to determine the value of the interpupillary distance or fitting height, geometrical parameters of the frame. Such a manual measurement may use a ruler as measuring unit.

A second category of processes corresponds to an automatic measurement of said value of the fitting parameter using, as measuring unit, an image capture device and a treatment module programmed to determine the fitting parameter on the basis of an image captured, for example to determine the value of the interpupillary distance, fitting height, and geometrico-morphological parameters relative to the position and/or orientation of the frame relative to the head of the subject or geometrical parameters of the frame.

A third category of processes corresponds to an automatic measurement of the value of the fitting parameter using a dedicated device as measuring unit, for example using a reader to measure the geometrical features of the frame or a rhinometer to measure the morphological parameters of the subject.

A fourth category of processes corresponds to a subjective measurement of said value of the dioptric parameter using high precision device with steps equal to 0.01 diopter or inferior or equal to 0.12 diopter or standard precision device having steps of 0.25 diopter. This is achieved for example, with a phoropter as measuring unit.

A fifth category of processes corresponds to an objective measurement of said value of the dioptric parameter using photorefraction, and/or sciascopy and/or autorefractometry, using the associated usual devices as measuring unit.

Step b)

In step b), the level of uncertainty of said value measured in step a) is provided 200 (FIGS. 1 to 4).

In practice, step b) may be performed either after or before step a). The uncertainty may be predetermined based on implementation circumstances input by the operator before or after the effective achievement of the measurement.

As described hereafter, the determination of the level of uncertainty is usually achieved as a preliminary step. It may be determined once for a range of implementation circumstances and stored in a memory of the computer unit according to the invention.

The uncertainties taken into account may have different origins, as described hereafter.

A measurement uncertainty depending for example on the global performance of the instrument and protocol used for measurement, or depending on a individual indicator of measurement uncertainty for a given instrument or protocol, can be associated to each measurement process.

In step b), the level of uncertainty of the value measured in step a) is estimated taking into account at least one process parameter.

The process parameter comprises at least one of the following:
type of measurement process,
accuracy and/or reproducibility of the instrument used to carry out a measurement, if any,
accuracy of the model used, if any,
role of the operator,
sensitivity of the measurement process to variations linked to the operator, and/or the subject and/or the relative position of the frame and head of the subject.

The type of measurement process corresponds for example to one of the above-mentioned category of measurement processes. It takes into account the general features of the process performed, for example manual or automatic.

The accuracy of the instrument used may also be taken into account. For example, in the determination of the dioptric feature of the eye of the subject, phoropters having different levels of precision may be used. The value of the dioptric parameter will be determined with higher accuracy if the instrument used provides a higher precision. The reproducibility of the measurements made with the instrument used may also be taken into account.

Some measurement process may include the used of theoretical models. The accuracy of these models may also be taken into account. Such a model is for example described in U.S. Pat. No. 6,607,271.

The role of the operator carrying out the measurement process may also be taken into account. As a general rule, the bigger the role of the operator is, the less accurate the measurement is. Therefore, an automatic process with little influence of the operator will be considered as more accurate than a manual process.

Finally, a sensitivity of the measurement process to variations linked to the operator, and/or the subject and/or the relative position of the frame and head of the subject may be estimated and taken into account.

More precisely, in step b), the level of uncertainty of said measurement process is for example estimated taking into account an uncertainty linked to at least one implementation circumstance of said measurement process, wherein said implementation circumstance comprises at least one of the following implementation circumstances:
identity of the operator of the measurement process,
type of device used for carrying out the measurement process,
operating protocol used for carrying out the measurement process,
identity of the subject submitted to the measurement process,
variability of the relative position of the frame and head of the subject during the measurement process.

The uncertainties can indeed be linked to the operator achieving the measurement: he or she can have specific reproducibility, or accuracy, based for example on his or her experience.

The uncertainty can also be linked to the device used: some device may provide very reproducible measurement, but with inaccuracies compared to a reference device. An offset may exist when measuring the same parameter on the same subject using different devices.

The uncertainty can be linked to the operating protocol used: for instance, in a first operating protocol, the subject may be asked to stand up when measuring the fitting height, or the head posture in primary gaze direction.

Using the same device, the same operator following a second operating protocol may ask the subject to sit down. The value measured for the fitting height may then be different and exhibit a different uncertainty.

The uncertainty can also come from the subject. It may be linked to instability of the posture of the subject, to the instability of the frame of the face of the subject, therefore to the shape of the face of the subject, or to physiological feature of the subject. For example, the subject may have a non stable posture while conducting the measurement of said parameter, leading to uncertainty, for instance while measuring fitting height. The subject may also have a refraction power that may change over time, for example if the subject is diabetic. The shape of the nose of the subject and the features of the frame may also cause the frame to easily slide on the nose of the subject, leading to uncertainty.

Usually, the achievement of said measurement process is linked to a set of several implementation circumstances. This set comprises for example, the identity of the operator, the type of device used and the operating protocol used.

More precisely, in step b), the level of uncertainty of said measured value is estimated through a statistical method. In particular, the level of uncertainty may be determined by taking into account an accuracy and/or a reproducibility of the measured value.

This statistical method relies on data acquisition during multiple occurrences of the measurement process, with different implementation circumstances or sets of several implementation circumstances, that is, for example, different operators and/or different devices and/or different operating protocols and/or different subjects.

As many occurrences as possible are recorded. Preferably, a statistical number of occurrences are acquired, such as at least 50 or 100 or a number comprised between 50 and 100 occurrences.

Each implementation circumstance may be varied among predefined practical possible circumstances.

For example, the operator may be varied inside the list of persons that may operate the measuring device or carry out the measurement process. The type of device may be varied inside the different possible device categories as described before. The operating protocol may also be varied among the different protocols available. Finally, different subjects of a group of subjects may be tested.

For each of this predefined practical possible circumstance, an uncertainty is determined by a statistical method 300. This statistical method allows estimating an accuracy and/or reproducibility of the measured value when said implementation circumstance is implemented.

In a first embodiment of the statistical method, it comprises the following steps:
measuring values of said fitting or dioptric parameter using said measurement process for a large number of occurrences of the measurement process, while varying said implementation circumstances among said predefined practical possible circumstances,
determining a reference mean of the values of said fitting or dioptric parameter determined while varying said implementation circumstance among the predefined practical possible circumstances,
determining the uncertainty linked to each predefined practical possible circumstance for said implementation circumstance by comparing a value of the fitting or dioptric parameter measured with this predefined practical possible circumstance with said reference mean.

The level of uncertainty determined thanks to this first embodiment depends on the accuracy of the measured value.

Preferably, when the measurement process is linked to a set of implementation circumstances, the step of measuring values of said fitting or dioptric parameter is achieved for a large number of occurrences of the measurement process, while varying only one implementation circumstance of said set among said predefined practical possible circumstances, and keeping the other implementation circumstances of said set identical or similar.

In a second embodiment of the statistical method, it comprises the following steps:
measuring values of said fitting or dioptric parameter using said measurement process for a large number of occurrences of said measurement process, while varying at least one of said implementation circumstances among said predefined practical possible circumstances,
determining a reference standard deviation of the values of said fitting or dioptric parameter determined while varying said implementation circumstance among the predefined practical possible circumstances,
determining said uncertainty linked to each predefined practical possible circumstance of said implementation circumstance by comparing a standard deviation of values of the fitting or dioptric parameter measured with this predefined practical possible circumstance with said reference standard deviation.

The level of uncertainty determined thanks to this second embodiment depends on the reproducibility of the measured value.

Finally, it is possible to consider combining both embodiments of the statistical method by determining for each predefined practical possible circumstance both a reference mean and a reference standard deviation and comparing a mean and a standard deviation value of the parameter measured with this predefined practical possible circumstance with said reference mean and reference standard deviation. The level of uncertainty determined thanks to this combined embodiment depends on the accuracy and on the reproducibility of the measured value.

The level of uncertainty may be quantified based on the difference between mean and/or standard deviation of the measured value and/or reference mean and standard deviation. The level of uncertainty is then equal to the value of the uncertainty, for example equal to the difference between mean and/or standard deviation of the measured value and/or reference mean and standard deviation. It may also be expressed as one of several categories such as high, medium, low. The determination of the level is then based on the comparison between the difference between mean and/or standard deviation of the measured value and reference mean and/or standard deviation and predetermined thresholds.

In a general manner, the level of uncertainty may be a quantity which is added or subtracted to the parameter value in comparison with what is considered as a reference value for the considered parameter, which can be a fitting parameter, dioptric value, etc. . . . . In other words, it may correspond to the absolute value of the difference between the parameter value and a predetermined reference value for this parameter. This variation of the parameter value versus the reference value is expressed with the same dimension as the reference value.

For example, a difference between mean fitting height measured and reference mean for the fitting height lower than 0.5 millimeter would indicate a low level of uncertainty. A difference between mean fitting height measured and reference mean for the fitting height higher than 3 millimeters would indicate a high level of uncertainty. A difference between mean fitting height measured and reference mean for the fitting height between 0.5 millimeter and 3 millimeters would indicate a medium level of uncertainty.

A difference between mean spherical refraction measured and reference mean for spherical refraction lower than 0.12 diopter would indicate a low level of uncertainty. A difference between mean spherical refraction measured and reference mean for spherical refraction higher than 0.5 diopter would indicate a high level of uncertainty. A difference between mean spherical refraction measured and reference mean for spherical refraction between 0.12 diopter 0.5 diopter would indicate a medium level of uncertainty.

The statistical method is preferably performed in a preliminary calibration step. In particular, it is performed to determine the accuracy and/or reproducibility of the measured values with the measuring unit used.

Step c)

In step c), said optical feature of said ophthalmic lens is determined 500; 510; 520; 620; 640 (FIGS. 1 to 4) by taking into account said value measured in step a) and said level of uncertainty provided in step b).

Figure 3:
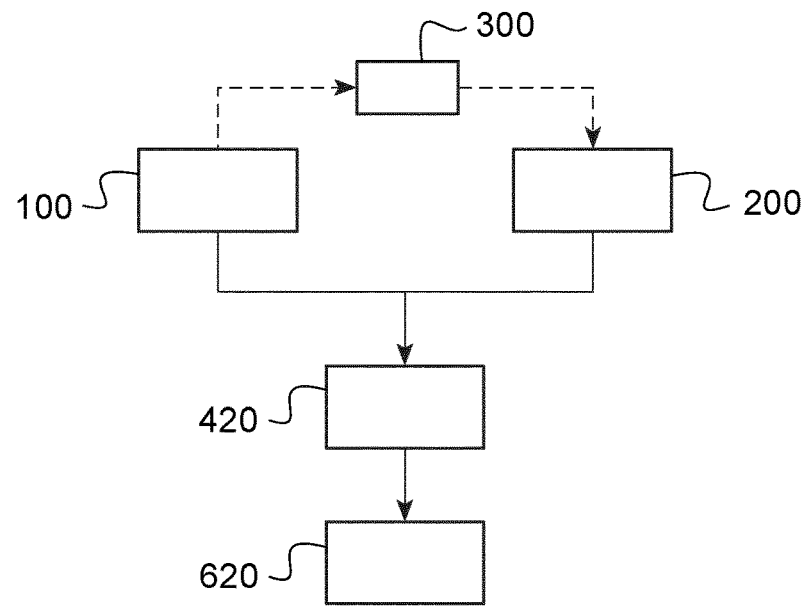

According to a first embodiment of step c), represented on FIGS. 1 and 3, it comprises the following:
  determining 400; 420 a corrected value of said fitting or dioptric parameter based on said value measured in step a) and on the level of uncertainty estimated in step b),
  determining 500; 620 said optical feature of the lens based on this corrected value.

Figure 2:
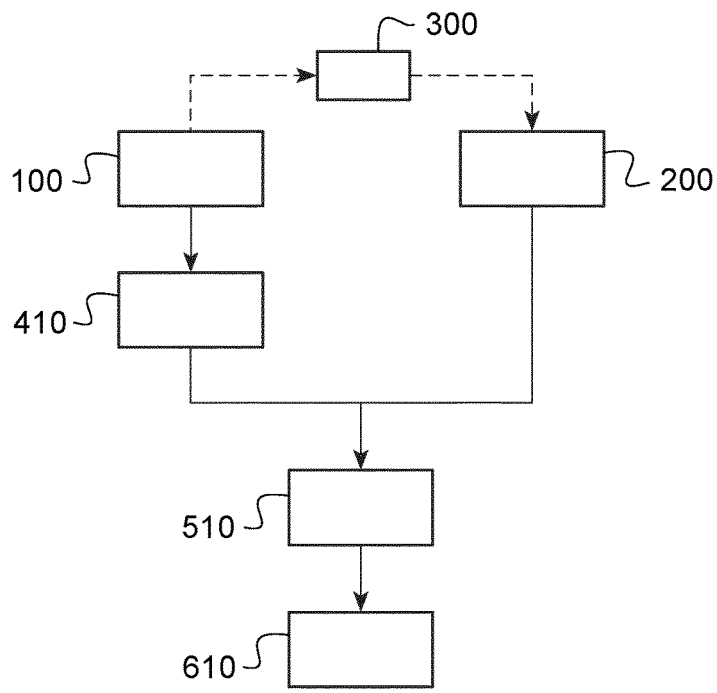
Figure 4:
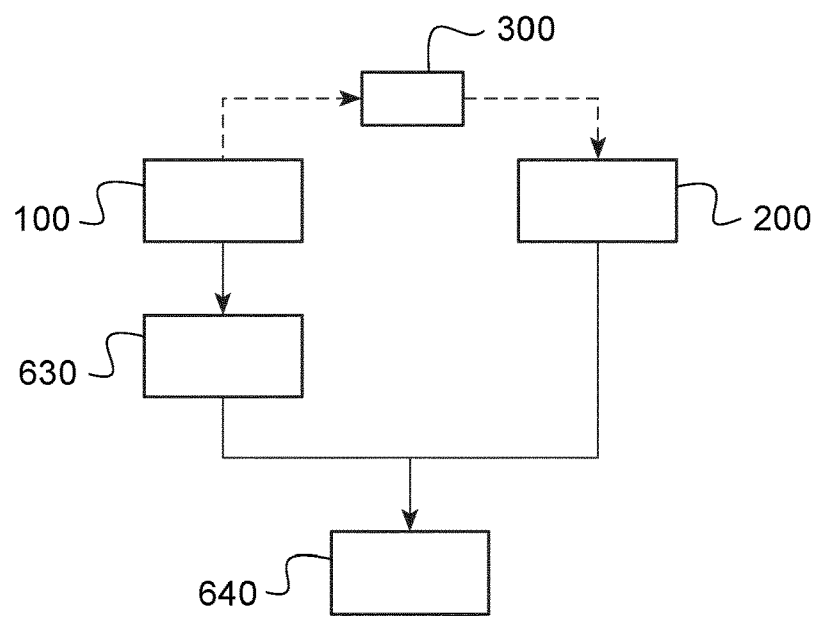

According to a second embodiment of step c), represented on FIGS. 2 and 4, it comprises the following:
  determining 410; 630 a preliminary optical feature of the lens based on the value measured in step a) without taking into account said level of uncertainty estimated in step b), and
  correcting 510; 640 said preliminary optical feature based on said level of uncertainty estimated in step b) to obtain said optical feature.

With each of the first and second embodiments of step c), an optical design based on the optical feature determined may be determined. This optical design may be determined after determining the optical feature, by taking it into account (see FIGS. 1 and 2), or the determination of the optical feature may be achieved by determining the optical design (FIGS. 3 and 4).

In the embodiments of the method of FIGS. 1 and 2, the optical feature of the lens is determined in blocks 500, 510 and the optical design is deduced in blocks 600; 610.

In the embodiments of the method of FIGS. 3 and 4, step c) of determining said optical feature is achieved directly by choosing 620 and/or modifying 640 an optical design from a predetermined set of optical designs.

In the embodiment of the method of FIG. 3, a corrected value of said fitting or dioptric parameter based on said value measured in step a) and on the level of uncertainty estimated in step b) is determined in block 420.

The optical design of the lens, and with it the optical feature of the lens is directly deduced from this corrected parameter value, according to usual methods.

Alternatively, step c) may also comprise (FIG. 4):
  determining 630 a reference optical design by calculation based on the value of the fitting or dioptric parameter measured in step a) and a theoretical low level of uncertainty and
  modifying 640 this reference optical design based on said level of uncertainty estimated in step b).

The determination of the optical feature and/or optical design is achieved by the computer unit, programmed with specific algorithms.

The reference design is determined according to the classical method known from the man skilled in the art. This determination is based on the assumption that the input values, that is the fitting and/or dioptric parameter values used for determining this reference design, is accurate and reproducible.

According to the invention, this reference design is modified depending on the measurement process used, that is depending on the measuring unit used and/or measurement protocol followed, operator involved, etc. . . . .

In particular, as an example, the position of the beginning of the progression corridor, in other words, the gaze declination or gaze direction for which the progression corridor begins, is modified depending on the level of uncertainty of the measurement process: higher is the uncertainty, lower the position of the beginning of the progression corridor is on the surface of the lens. In other words, the gaze declination for which the progression corridor begins is oriented is bigger with the convention of the figures. In the same time, if the progression corridor begins lower, the progression length has to be reduced consequently.

A way to obtain this is to modify said reference optical design by moving the fitting cross. More precisely, the fitting cross is moved upwards by a first distance determined based on said level of uncertainty and decreasing the progression length by a second distance based on said level of uncertainty. The second distance may be the same as the first distance or a different distance based on said level of uncertainty.

This first distance may be a fixed predetermined distance associated with the level of uncertainty or calculated depending on the uncertainty. It is for example equal to a fraction of the uncertainty in millimeters, this fraction being comprised between a quarter of the uncertainty and the full uncertainty. The progression length may be decreased by a second distance comprised between a quarter of the uncertainty and the twice the uncertainty.

Some features of an initial progressive lens design are shown on FIGS. 5 to 7. For easy comparison with the modified optical designs, the features of this initial progressive design are also presented on FIGS. 14 to 16 and 23 to 25. The prescription is plano, with an addition of 2.5 D. This initial progressive lens design is a reference optical design. It is adapted when using a measurement process giving values with very low uncertainty for the fitting and/or dioptric parameter.

According to the invention, such a reference optical design is kept unmodified for measurement processes with high precision, for example controlling the subject posture for distance vision and using a video centering system. It is for example appropriate when pupillary distance and fitting height are determined with an uncertainty lower than 0.25 mm. It is appropriate when a precise refraction protocol with accuracy of 0.12 D or less is used.

Depending on the level of uncertainty of the measurement process, the method according to the invention allows to modify this reference optical design, to enlarge the far vision zone by starting the progression corridor lower on the lens.

Modifications of this reference optical design may be for example based either on the precision of the measure of the fitting height (see hereafter cases 1 and 2) or on the precision of the measure of the refraction features of the eye of the subject, either for refraction power in far vision (see hereafter cases 3 and 4) or in near vision (see hereafter cases 5 and 6).

A first modification (hereafter case 1) may be proposed when the level of uncertainty on the measurement process for measuring fitting height is low, meaning that the fitting height measured is quite certain. This case 1 corresponds to an uncertainty of 1 mm on fitting height.

The first modification then comprises:
  translating the optical function by 2 degrees, which is substantially equivalent to moving the fitting cross of the reference optical design up by 1 mm, the optical function being defined as the distribution of powers of the lens as a function of the gaze directions;

decreasing the progression length of the reference optical design by 1 mm.

The first modified optical design obtained presents the features shown on FIGS. 8 to 10.

A second modification (hereafter case 2) may be proposed when the level of uncertainty on the measurement process for measuring fitting height is high, meaning that the fitting height measured is quite uncertain. This case 2 corresponds to an uncertainty of 2 mm on fitting height.

The second modification then comprises:

translating the optical function by 4 degrees, which is substantially equivalent to moving the fitting cross of the reference optical design up by 2 mm the optical function being defined as the distribution of powers of the lens as a function of the gaze directions;

decreasing the progression length of the reference optical design by 2 mm.

The second modified optical design obtained presents the features shown on FIGS. 11 to 13.

The table 1 below shows the corresponding declination gaze in, degrees for far vision (FV), near vision (NV) and fitting cross (FC), and associated power and astigmatism values in diopters.

TABLE 1

|   | Lowering gaze | | | Power | | | Astigmatism | | |
|---|---|---|---|---|---|---|---|---|---|
|   | Initial | Case 1 | Case 2 | Initial | Case 1 | Case 2 | Initial | Case 1 | Case 2 |
| FV | −8.57 | −8.57 | −8.57 | 0.00 | 0.00 | 0.00 | 0.00 | 0.00 | 0.00 |
| FC | −0.17 | −0.17 | −0.17 | 0.06 | 0.02 | 0.00 | 0.06 | 0.06 | 0.05 |
| NC | 34.74 | 34.74 | 34.74 | 2.81 | 2.80 | 2.82 | 0.10 | 0.02 | 0.07 |

As shown in table 1 and on the FIGS. 8 to 13, the progression corridor starts lower for the optical design of case 1 compared to the initial progressive design. It starts lower for the optical design of case 2 compared to the optical design of case 1. Powers at far vision and near vision are maintained.

The modified optical designs of case 1 and case 2 allow maintaining a good visual performance even in case of large fitting error. Powers at far vision and fitting cross will be maintained, fields of vision are maximized, near vision accessibility is maintained. However, resulting astigmatism fields of vision for iso 0.25 D are enlarged at fitting cross.

When modifying the reference optical design on the basis of the uncertainty of the measurement process of the refraction in far vision, the spherical power of the optical design at far vision and position of the fitting cross may be modified depending on the level of uncertainty of the measurement process. Lower is the uncertainty, lower is the spherical power of the lens in the far vision zone. In this way, the spherical power of the lens is not stabilized around the far vision zone, and the subject looking through the lens can choose the most appropriate spherical power to see clearly at far. In the same time, the spherical power in the near vision zone of the lens will be maintained.

The modification comprises here determining a corrected value of the dioptric parameter. The far vision refraction determined is corrected by subtracting a corrective factor depending on the uncertainty of the measurement process. The corrective factor is for example comprised between half the uncertainty and the full uncertainty value. A third modification (hereafter case 3) may be proposed when the level of uncertainty on the measurement process for determining the refraction of the subject in far vision is medium, meaning that the refraction measured is not very certain.

This case 3 corresponds to an uncertainty of 0.25 D on refraction in far vision measured with a standard subjective refraction protocol.

The third modification comprises:

modifying the spherical power of the reference optical design at the far vision point: a modified spherical power Rxcorr at the far vision point of the modified optical design is equal to the measured refraction Rxmes of the subject minus 0.25 D: Rxcorr=Rxmes−0.25;

stabilizing the spherical power of the modified optical design from the far vision point to the top of the lens, that is, imposing that the spherical power of the modified optical design remains in a predefined range about the modified spherical power between the far vision point and the top of the lens; this range may be comprised between 0.25 to 1 times the uncertainty (here equal to 0.25 diopter);

providing the measured refraction Rxmes value at the fitting cross of the modified optical design.

Figure 17:
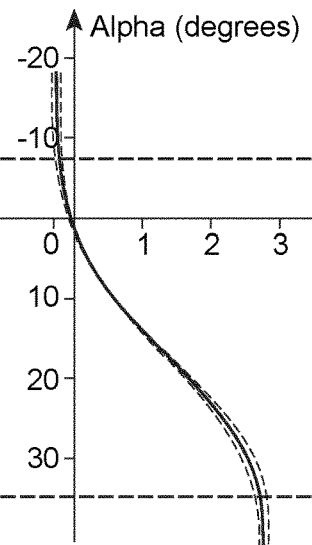
Figure 18:
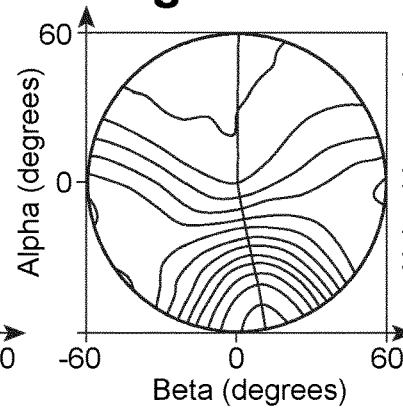
Figure 19:
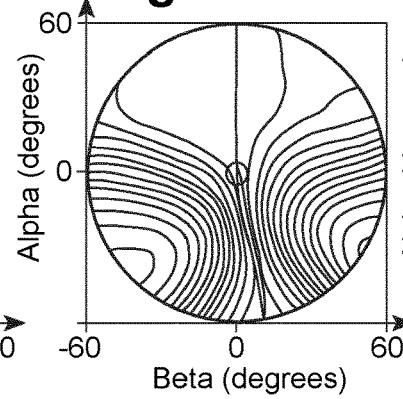

The third modified optical design obtained presents the features shown on FIGS. 17 to 19.

A fourth modification (hereafter case 4) may be proposed when the level of uncertainty on the measurement process for determining the refraction of the subject in far vision is medium, meaning that the refraction measured is not very certain.

This case 4 corresponds to an uncertainty on refraction in far vision measured such as the uncertainty obtained by measures with an autorefractor.

The fourth modification comprises modifying the power profile before the progression corridor, around the far vision point, by introducing a small power progression from Rxmes minus the uncertainty to Rxmes plus the uncertainty. In particular, it comprises:

modifying the profile of the progression corridor, that is the rate of the increase or decrease in diopter per distance unit along the progression corridor, and increasing the spherical power of the modified optical design at the fitting cross.

The measured refraction Rxmes value is provided at the far vision point of the modified optical design, as it is the case in the reference design.

The profile of the progression corridor is changed so that it is no more stabilized at far vision. Spherical power will be stabilized about 10° higher on the lens, where a modified spherical power Rxcorr equal to the measured refraction Rxmes of the subject minus 0.25 D: Rxcorr=Rxmes−0.25 is reached. The fourth modified optical design obtained presents the features shown on FIGS. 20 to 22.

The table 2 below shows the corresponding declination gaze in degrees, for far vision (FV), near vision (NV) and fitting cross (FC), and associated power and astigmatism values in diopters.

TABLE 2

| | Lowering gaze | | | Power | | | Astigmatism | | |
|---|---|---|---|---|---|---|---|---|---|
| | Initial | Case 3 | Case 4 | Initial | Case 3 | Case 4 | Initial | Case 3 | Case 4 |
| FV | -8.57 | -8.57 | -8.57 | 0.00 | -0.22 | 0.00 | 0.00 | 0.09 | 0.00 |
| FC | -0.17 | -0.17 | -0.17 | 0.06 | 0.00 | 0.43 | 0.06 | 0.00 | 0.14 |
| NV | 34.74 | 34.74 | 34.74 | 2.81 | 2.81 | 2.80 | 0.10 | 0.15 | 0.20 |

In case 3, the power is stabilized from the top of the lens down to the far vision point similarly to the reference optical design.

Far vision power, that is to say, the spherical power at the far vision point, is upgraded of almost 0.25 D compared to the far vision refraction measured and prescribed. The far vision refraction measured and prescribed is reached at the fitting cross. This has the effect to tighten the astigmatism fields of vision at the fitting cross.

At the end, the near vision power that is to say, the spherical power at the near vision point, is maintained equal to the power of the reference optical design at the near vision point for the same lowering gaze.

In case 4, the spherical power of the modified optical design continues to evolve between the far vision point and the -20° lowering gaze direction, up to the measured refraction value+0.25 D.

The far vision power corresponding to the measured refraction for far vision is reached at the same lowering gaze, corresponding to far vision point. The modification of power progression profile has the effect to increase spherical power value at the fitting cross, this also affect the astigmatism-free fields of vision which are narrower compared to the initial lens. At the end the near vision spherical power is maintained equal to the spherical power of the reference optical design at near vision point.

When modifying the reference optical design on the basis of the uncertainty of the measurement process of the refraction in near vision, the spherical power of the optical design at far vision and position of the fitting cross may be modified depending on the level of uncertainty of the measurement process. Lower is the uncertainty, higher is the spherical power of the lens in the near vision zone. In the same time, the spherical power in the far vision zone of the lens will be maintained as it was in the reference optical design.

The modification comprises here determining a corrected value of the dioptric parameter. The near vision refraction determined is corrected by adding a corrective factor depending on the uncertainty of the measurement process. The corrective factor is for example comprised between a quarter of the uncertainty and the full uncertainty value.

A fifth modification (hereafter case 5) may be proposed when the level of uncertainty on the measurement process for determining the refraction of the subject in near vision is medium, meaning that the refraction measured is not very certain.

This case 5 corresponds to an uncertainty of 0.25 D on refraction in near vision measured, such as obtained with a standard subjective refraction protocol.

The fifth modification comprises modifying the spherical power at the near vision point (hereafter near vision power) by adding 0.25 D to the measured value of the refraction of the subject in near vision conditions. The spherical power at 85% of prescribed addition and at the far vision point remains identical to those of the reference optical design.

Figure 26:
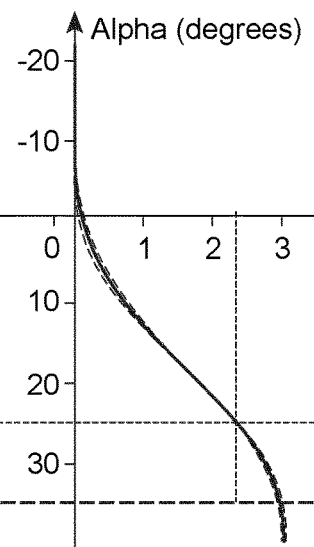
Figure 27:
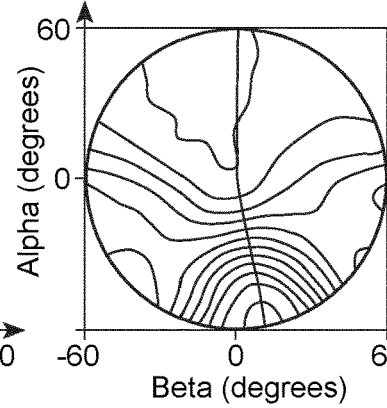
Figure 28:
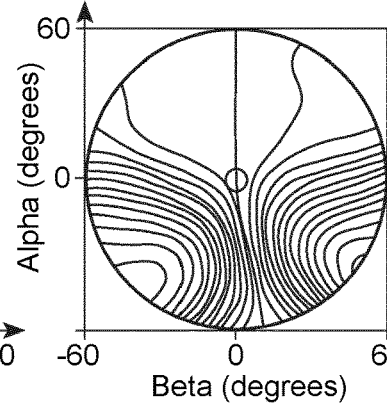

The fifth modified optical design obtained presents the features shown on FIGS. 26 to 28.

A sixth modification (hereafter case 6) may be proposed when the level of uncertainty on the measurement process for determining the refraction of the subject in near vision is medium, meaning that the refraction measured is not certain. This is the case, for example, for measure obtained with an autorefractor.

The sixth design modification comprises adding 0.25 D to the spherical power of the reference optical design at the point located 10° higher than the near vision point. The idea is not to stabilize the spherical power around the near vision point, then to increase the power below the near vision point.

The profile of the progression corridor, that is the rate of the increase or decrease in diopter per distance unit along the progression corridor, is consequently modified about the near vision point.

The sixth modified optical design obtained presents the features shown on FIGS. 29 to 31.

The table 3 below shows the corresponding declination gaze, in degrees, for far vision (FV), near vision (NV) and fitting cross (FC), and associated power and astigmatism values in diopters.

TABLE 3

| | Lowering gaze | | | Power | | | Astigmatism | | |
|---|---|---|---|---|---|---|---|---|---|
| | Initial | Case 3 | Case 4 | Initial | Case 3 | Case 4 | Initial | Case 3 | Case 4 |
| FV | -8.57 | -8.57 | -8.57 | 0.00 | 0.00 | 0.00 | 0.00 | 0.00 | 0.00 |
| FC | -0.17 | -0.17 | -0.17 | 0.06 | 0.06 | 0.07 | 0.06 | 0.10 | 0.06 |
| 0.85*2.75 D | 25.09 | 25.11 | 28.54 | 2.35 | 2.35 | 2.35 | 0.09 | 0.05 | 0.10 |
| NV | 34.74 | 34.74 | 34.74 | 2.81 | 3.04 | 2.84 | 0.10 | 0.09 | 0.14 |
| Under NV | 39.84 | 39.83 | 40.07 | 2.78 | 3.11 | 3.10 | 0.06 | 0.03 | 0.13 |

For both cases 5 and 6, far vision power is stabilized. Power at far vision is equal to the measured and/or prescribed refraction of the subject.

For both cases 5 and 6, the progression corridor starts at the fitting cross, as in the reference optical design. Astigmatism fields of vision at fitting cross for iso 0.25 D are similar.

The profile of the progression corridor of the modified optical design of case 5 is similar to the profile of the reference optical design up to addition 2.35 D which correspond to 85% of the near vision power. For higher declination, the profile of the progression corridor of case 5 differs from the reference optical design to reach 3.04 D at near vision point.

This corresponds to the initial near vision power (2.81 D) with addition of 0.25 D. Near vision power under the near vision point is as stabilized as the initial lens.

The profile of the progression corridor of the modified optical design of case 6 is different from the profile of the reference optical design.

The lowering gaze where 85% of the near vision power of the modified optical design (case 6) is reached is higher. Despites this, near vision power is maintained identical to that of the reference optical design. Near vision power under the near vision point is not stabilized anymore, in order to reach the near vision power plus 0.25 D around 40° lowering gaze.

Step d)

Advantageously, the method according to the invention comprises a further step d) of determining an optical design of a lens by calculations based on said optical feature determined in step c).

As mentioned before, the step of determining an optical design may be performed together with step c). In cases where an optical design is not determined at step c), it may be achieved in an additional step d).

The optical design calculated in step d) may be calculated on the basis of usual design algorithms, taking into account the optical feature determined in step c). The optical design is then directly calculated by taking into account the optical feature determined depending on the level of uncertainty.

Alternatively, in step d) a predetermined optical design may be chosen from a predetermined set of optical designs.

Examples

As a first example, when determining the uncertainty linked to the identity of the operator, the statistical method comprises determining the mean and/or the standard deviation of measured values of parameters for a large set of measurements and a large set of operators using similar device and measuring protocols.

The uncertainty is more precisely linked to the performance of the operator.

Then, for each operator, the mean and/or standard deviation of the measured values of the parameter determined by this operator is compared with a reference mean and/or standard deviation of the measured values of the parameter. The reference mean and/or standard deviation of the measured values of the parameter may be determined as the mean and/or standard deviation of the measured values of the parameter determined by all the operators.

For instance, the reference mean and/or reference standard deviation can be the averaged mean and/or averaged standard deviation of all operators and the reference standard deviation can be the averaged standard deviation of all operators.

If the standard deviation of the values of the parameter measured by an operator among the set of operators is close to the reference standard deviation, uncertainty linked to this operator is determined as medium. If it is less than the reference standard deviation, the operator uncertainty is determined as low, and if it is more than the reference standard deviation, the operator uncertainty is determined as high. A score may be associated with the low, medium and high levels of uncertainty.

If the mean of the values of the parameter measured by an operator among the set of operators is close to the reference mean, the uncertainty linked to this operator is determined as low, while it is determined as medium or low when the mean of the values of the parameter measured by an operator among the set of operators is diverging from the reference mean.

For example, considering a set of 100 operators, using similar device and measuring protocols, preferably based in the same country to avoid dispersion of measurement due to local specificities.

Some filtering may be done for instance to calculate the mean and/or standard deviation of the values of the parameters measured by each operator for specific population categories, such as children, young adult, presbyopic, male or female subjects.

For each operator of this set of operators, at least 1000 measurements of addition were done for example for presbyopic females of the same age, and the standard deviation and mean of these values of addition were calculated. The groups of presbyopic females measured by each operator are different groups.

These measurements could be made for any other specific population categories, such as persons in the same age range 45 to 50, 50 to 55, 55 to 60 for example.

The reference means and reference standard deviation are calculated based on these measurements. The reference mean is for example equal to 2.1 diopters (D) and the reference standard deviation is for example 1.4 D.

The means of the addition values measured by each one of all the operators are in the range between 1.94 D and 2.2 D and the standard deviations are in the range between 1.2 to 1.6 D.

A first operator has measured values of addition with a mean addition of 1.99 D and a standard deviation of 1.3 D. His level of uncertainty is very low because the mean of the values of addition measured by this first operator is very close to the reference mean, denoting a high accuracy, and the standard deviation of the values of addition measured by this first operator is less than the reference standard deviation, denoting a high reproducibility.

A second operator has measured values of addition with a mean addition of 2.2 D and a standard deviation of 1.5 D. His level of uncertainty is high because the mean of the values of addition measured by this second operator is quite different from the reference mean which is 1.98 D, denoting a low accuracy, and the standard deviation of the values of addition measured by this first operator is more than the reference standard deviation, denoting a low reproducibility.

Once the level of uncertainty for said operators has been determined in a preliminary step b), it is used in further steps c) to determine the optical feature corresponding to the parameter value measured in step a).

For operators having low reproducibility it can be proposed in step c) and/or d) to modify the reference optical design as described in cases 5 or 6. For operator having low accuracy, it may be proposed also to further modify the spherical power at near vision point used in case 6 by substracting the difference between the mean value measured and the mean reference.

For instance, for said second operator, the mean addition has 0.4 D overvalue compare to mean reference. This difference of 0.4 D is subtracted from the measured refraction in near vision, so that finally, the spherical power at the point located 10° lower than the near vision point has the following spherical power: measured refraction+0.25 D−0.4 D.

In a second example, in step b), when determining the uncertainty linked to device used, a similar statistical method may be used.

For example, data relative to the measurement of fitting heights for many different subjects, using different devices may be collected. Preferably, the fitting heights of a same set of subjects may be measured thanks to different devices. These data are treated to determine that:

- with a first type of device, the mean fitting height measured is 17.3 millimeters (mm), with a standard deviation of 2.1 mm;
- with a second type of device, the mean fitting height measured is 17.1 millimeters (mm), with a standard deviation of 1.8 mm;
- with a third type of device, the mean fitting height measured is 17.8 millimeters (mm), with a standard deviation of 3.1 mm.

The reference fitting height mean is for example the averaged value for all devices, that is 17.4 mm. The reference fitting height standard deviation is for example the averaged value for all devices, that is 2.33 mm.

The first type of device has measured values of fitting height very close to the reference mean, denoting a high accuracy, and the standard deviation of the values of addition measured by this first operator is less than the reference standard deviation, denoting a high reproducibility. This first type of device has a low level of uncertainty.

The second device has a medium level of uncertainty. Its accuracy is medium as the measured values of fitting height are further away from the reference mean, but its reproducibility is high.

The third device has a high level of uncertainty, as the measured values of fitting height are quite different from the reference mean and the standard deviation is higher than the reference standard deviation. Accuracy and reproducibility are low.

In said second example, the fitting height can be modified according to the fitting height reference mean: for said first device, the fitting height taken into account is increased by 0.1 mm, for the second device by 0.3 mm, for the third device by −0.4 mm.

If the measurements obtained with the third device exhibit low reproducibility, the following modification may be applied to the reference optical design in step c) and/or d): moving the fitting cross up by 2 mm and decreasing progression length by 2 mm.

This modification gives appropriate results for a 2.5 millimeters reproducibility.

In a similar way, it may be propose to modified mean value for other fitting parameters (pantoscopic angle, wrap angle, ERC . . . ) when using different devices or having different operators, so as to get offset from the reference value and correct them.

So for instance, any parameter value, such as pantoscopic angle and wrap angle (Pi, Wi), measured with device i may be modified to become a corrected value of the parameter (Pi',Wi') so that deviation between mean value (Pmi, Wmi) for device i and reference value (Pref, Wref) are suppressed. In other words, the measured value of a parameter is corrected for example by adding or subtracting the difference between the mean value of this parameter measured by the device used and the reference value of this parameter.

The difference between mean value of this parameter measured by the device used and the reference value of this parameter is determined in the preliminary step b) and corresponds to the level of uncertainty of the device used.

For example, (Pi, Wi) is corrected into (Pcorri, Wcorri), avec Pcorri=Pi+Pref−Pmi and Wcorri=Wi+Wref−Wmi.

The corrected value of the parameter is then taken into account to choose a predetermined optical design or to directly calculate an optical design.

When determining the uncertainty linked to the subject wearer itself (non stable posture for instance), it may be possible to get a standard deviation of the subject posture from a set of images for instance. We may ask the wearer to look straight away, then look any other direction, then again look straight away etc. . . . . .

Each time the wearer look straight away, the posture may be recorded via a camera or an accelerometer placed on the eyewear. The standard deviation of the posture is then determined from the multiple measurement. A method similar to what was described earlier is then applied.

Thanks to the method according to the invention, existing designs may be modified in order to make them more robust to fitting errors or refraction's values variations.

The invention claimed is:

1. A method for determining at least an optical feature of an ophthalmic lens to be placed in a frame for vision correction of a subject, comprising:
    a) measuring a value of a fitting parameter linked to the subject and/or the frame or a value of a dioptric parameter of the subject, thanks to a measurement process;
    b) providing a level of uncertainty of said value measured in step a) depending on said measurement process, said level of uncertainty provided in b) being expressed as one of several categories including high, medium, and low; and
    c) determining said optical feature of said ophthalmic lens by taking into account said value measured in step a) and said level of uncertainty provided in step b);
    wherein, in b), the level of uncertainty of the value measured in a) is estimated taking into account at least one process parameter, the at least one process parameter includes at least one of:
    type of measurement process,
    accuracy and/or reproducibility of an instrument used to carry out a measurement,
    accuracy of a model used,
    role of an operator, and
    sensitivity of the measurement process to variations linked to the operator, and/or the subject and/or a relative position of the frame and head of the subject, and
    wherein in c), said optical feature determined by taking into account said value measured in a) and said level of uncertainty provided in b) is made to be more or less robust to variations of the value measured in a), depending on the level of uncertainty.

2. The method according to claim 1, wherein said optical feature determined in step c) comprises at least one of the following:
    a value of a dioptric feature of the lens,
    a position of a remarkable point on the lens,
    a position and/or extent and/or shape of a remarkable zone of the lens.

3. The method according to claim 1, wherein said fitting parameter comprises at least one of the following:
    a geometrical parameter of the frame,
    a morphological parameter of the subject,
    a geometrico-morphological parameter relative to the position and/or orientation of the frame relative to the head of the subject, and
    a behavioral parameter of the subject.

4. The method according to claim 3, wherein
said geometrical parameter of the frame comprises at least one of the following quantities: wrap angle of a frame and/or lens, inclination of a front portion of the frame relative to the temples or pantoscopic angle of the frame, horizontal and/or vertical size of a front part of the frame,
said morphological parameter of the subject comprises at least one of the following quantities: pupillary distance, head width, rhinometer parameters,
said geometrico-morphological parameter relative to the position and/or orientation of the frame relative to the head of the subject comprises at least one of the following quantities: fitting height, position of a reference point for near vision relative to the subject, position of the fitting cross relative to the subject, pantoscopic tilt or relative wrap angle of the frame and/or lenses placed on the head of the subject, position of the lens in the frame relative to an eye when the frame is placed on the head of the subject: distance between the center of rotation of the eye and the lens fitted in the frame, distance between an apex of a cornea and the lens fitted in the frame, and
said behavioral parameter of the subject comprises at least one of the following quantities: head posture data, reading distance, horizontal and/or vertical eye/head movement ratio in far vision or near vision.

5. The method according to claim 1, wherein said dioptric parameter comprises at least one of the following quantities: refraction and/or astigmatism value and/or axis for far and/or intermediate vision and/or near vision for each eye of the subject or an average value of previously cited quantities for both eyes, addition.

6. The method according to claim 1, wherein, in step b), the level of uncertainty of said value is estimated through a statistical method.

7. The method according to claim 1, wherein, in step b), the level of uncertainty of said measurement process is estimated taking into account an accuracy and/or a reproducibility of the value measured in step a).

8. The method according to claim 7, wherein, in step b), an uncertainty linked to an implementation circumstance is determined by a statistical method comprising the following steps:
measuring values of said fitting or dioptric parameter using said measurement process for a predetermined number of occurrences of the measurement process, while varying said implementation circumstance among predefined practical possible circumstances,
determining a reference mean of the values of said fitting or dioptric parameter determined while varying said implementation circumstance among said predefined practical possible circumstances, and
determining said uncertainty linked to each predefined practical possible implementation circumstance by comparing a value of the fitting or dioptric parameter measured in the specific implementation circumstance with said reference mean.

9. The method according to claim 1, wherein, in step b), the level of uncertainty of said measurement process is estimated taking into account an uncertainty linked to at least one implementation circumstance of said measurement process, wherein said implementation circumstance comprises at least one of the following implementation circumstances:

identity of the operator of the measurement process,
type of device used for carrying out the measurement process,
operating protocol used for carrying out the measurement process,
identity of the subject submitted to the measurement process, and
variability of the relative position of the frame and head of the subject during the measurement process.

10. The method according to claim 9, wherein, in step b), an uncertainty linked to an implementation circumstance is determined by a statistical method comprising the following steps:
measuring values of said fitting or dioptric parameter using said measurement process for a predetermined number of occurrences of said measurement process, while varying said implementation circumstance among predefined practical possible circumstances,
determining a reference standard deviation of the values of said fitting or dioptric parameter determined while varying said specific implementation circumstance among said predefined practical possible circumstances, and
determining said uncertainty linked to each predefined practical possible implementation circumstance by comparing a standard deviation of values of the fitting or dioptric parameter measured with this predefined practical possible circumstance with said reference standard deviation.

11. The method according to n claim 1, comprising, in step c),
determining a reference optical design by calculation based on the value of the fitting or dioptric parameter measured in step a) and a theoretical low level of uncertainty, and
modifying this reference optical design based on said level of uncertainty estimated in step b).

12. The method according to claim 11, wherein said reference optical design is modified by moving the fitting cross upwards by a distance determined based on said level of uncertainty and decreasing the progression length by the same distance or a different distance determined based on said level of uncertainty.

13. The method according to claim 12, wherein said distance is equal to a fraction of the uncertainty in millimeters, this fraction being comprised between a quarter of the uncertainty and the full uncertainty.

14. A device for determining at least an optical feature of an ophthalmic lens to be placed in a frame for vision correction of a subject, comprising:
a measuring circuit configured to measure a value of a fitting parameter linked to the subject and/or the frame or a value of a dioptric parameter of the subject, according to a measurement process; and
a computer configured to provide a level of uncertainty of said value measured by the measuring circuit depending on said measurement process, and determining said optical feature of said ophthalmic lens by taking into account said value measured by the measuring circuit and said level of uncertainty provided, said level of uncertainty provided being expressed as one of several categories including high, medium, and low,
wherein said level of uncertainty of said value measured by the measuring circuit is estimated taking into account at least one process parameter, the at least one process parameter including at least one of:

type of measurement process,
accuracy and/or reproducibility of an instrument used to carry out a measurement,
accuracy of a model used,
role of an operator, and
sensitivity of the measurement process to variations linked to the operator, and/or the subject and/or a relative position of the frame and head of the subject, and
wherein said optical feature is made to be more or less robust to variations of the value measured by the measuring circuit depending on the level of uncertainty provided.

* * * * *